United States Patent [19]

Yato et al.

[11] Patent Number: 4,873,031
[45] Date of Patent: Oct. 10, 1989

[54] METHOD OF CONTROLLING THE CRYSTAL GRAIN SIZE OF URANIUM DIOXIDE PELLET

[75] Inventors: Tadao Yato, Mito; Sadaaki Hagino, Urawa; Hiroshi Tanaka, Omiya, all of Japan

[73] Assignee: Mitsubishi Kinzoku Kabushiki Kaisha, Tokyo, Japan

[21] Appl. No.: 139,447

[22] Filed: Dec. 30, 1987

[51] Int. Cl.$^4$ .................. G21C 21/00; C09K 11/04; G21G 4/00; C04B 35/05
[52] U.S. Cl. .................. 264/0.5; 252/636; 252/637; 423/15; 423/258; 423/261; 501/152
[58] Field of Search .................. 264/0.5, 636, 637; 423/3, 2, 15, 251, 258, 261, 266; 501/152

[56] References Cited

U.S. PATENT DOCUMENTS

| | | | |
|---|---|---|---|
| 3,883,623 | 5/1975 | Lay | 264/0.5 |
| 4,035,468 | 7/1977 | Craigen et al. | 423/15 |
| 4,090,976 | 5/1978 | DeHollander et al. | 423/261 |
| 4,234,550 | 11/1980 | DeHollander | 423/261 |
| 4,235,740 | 11/1980 | Druckenbrodt et al. | 423/251 |
| 4,364,859 | 12/1982 | Ohtsuka et al. | 252/643 |
| 4,686,019 | 8/1987 | Ryan et al. | 204/1.5 |

OTHER PUBLICATIONS

Chem. Abst., vol. 109, No. 6, 109:45001m, Yato et al., 1988.
Chem. Abst., vol. 103, No. 6, 103:44372x, Chang, 1985.
Chem. Abst., vol. 101, No. 22, 101:194553e, Mitsubishi Nuclear Fuel Co., 1984.
Chem. Abst., vol. 82, No. 14, 8990m, Steeper et al., 1975.
Chem. Abst., vol. 106, No. 18, 106:145787d, Suzuki, 1987.

*Primary Examiner*—Howard J. Locker
*Attorney, Agent, or Firm*—Scully, Scott, Murphy & Presser

[57] ABSTRACT

A method of controlling the crystal grain size of $UO_2$ pellets is disclosed, which comprises
(1) providing an aqueous uranyl solution which is free of hydrofluoric acid and nitric acid and which contains uranyl fluoride ($UO_2F_2$) and/or uranyl nitrate ($UO_2(NO_3)_2$) as a uranium component,
(2) reacting with ammonia said aqueous uranyl solution to precipitate ammonium diuranate (ADU), while adjusting the ratio of said uranium components to a predetermined value within the range varying from the ratio 100% of uranyl fluoride and 0% of uranyl nitrate to the ratio 0% of uranyl fluoride and 100% of uranyl nitrate, adjusting the uranium concentration of the reaction mixture to 50 to 1,000 gU/liter and also adjusting the rate of contact between said uranium component in said aqueous uranyl solution with ammonia to at least 2 moles $NH_3$/min/mole U,
(3) calcining and reducing said ADU precipitate to form $UO_2$ powder, and
(4) molding and sintering said $UO_2$ powder, thus producing $UO_2$ pellet having a predetermined crystal grain size in the range varying from 5 to 100 micrometers.

4 Claims, No Drawings

METHOD OF CONTROLLING THE CRYSTAL GRAIN SIZE OF URANIUM DIOXIDE PELLET

BACKGROUND OF THE INVENTION

This invention relates to improvement in a method of fabricating uranium oxide powder suitable for the production of nuclear fuel starting from uranium hexafluoride more particularly to improvement in an ammonium diuranate method.

The ammonium diuranate (ADU) method is widely known as a method for producing from uranium hexafluoride ($UF_6$) uranium dioxide ($UO_2$) powder which is suited for the production of nuclear fuel. Most popular example of the ADU method is a method which comprises reacting $UF_6$ gas with water to form an aqueous uranyl fluoride ($UO_2F_2$) solution, reacting the aqueous $UO_2F_2$ solution with ammonia ($NH_3$) to precipitate ADU, filtering, drying, calcining and reducing the ADU precipitate to convert the thus processed ADU precipitate to $UO_2$ powder.

In the above-mentioned conventional method ADU is produced by reaction steps as shown in the following reaction schemes.

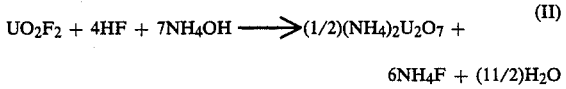

In the above method, as shown in the reaction scheme (I), there is 4 moles of hydrogen fluoride (HF) per mole of uranium (U) in the aqueous $UO_2F_2$ solution prepared by the hydrolysis of $UF_6$. In this case, in the production of ADU as shown in the reaction scheme (II), at first ammonium fluoride ($NH_4F$) is formed by neutralization with HF and as the result the ADU thus formed is in the form of primary grains whose grain size is relatively large. The greater the grain size of the primary grains of ADU the greater the grain size of the primary grains of $UO_2$ powder prepared from the ADU, which means that the $UO_2$ powder has a relatively low activity. When sintered pellets for nuclear fuel are produced from such $UO_2$ powder with a relatively low activity the sintered density of the pellets which can be produced under generally employed conditions is about 95% TD (theoretical density) and the grain size of the sintered pellet is about 10 micrometers.

Examples of the conventional ADU methods include, in addition to the above-described method in which ADU is produced from an aqueous $UO_2F_2$, a method in which ADU is produced from an aqueous uranyl nitrate ($UO_2(NO_3)_2$) solution. This method comprises hydrolyzing $UF_6$ gas in a nitric acid solution of a defluorinating agent to form an aqueous $UO_2(NO_3)_2$ solution, purifying the solution by solvent extraction, reacting the purified solution with ammonia to produce ADU, and then converting ADU to $UO_2$ powder in the same manner as in the above-described ADU method. With this method it is possible to obtain $UO_2$ powder having a very high activity and in this case it is possible to obtain sintered pellets having a high sintered density as high as 99% TD. However, with this highly active $UO_2$ powder the grain size of the sintered pellets to be obtained is at most in the order of 20 micrometers. In order to obtain sintered pellets with greater grain size from $UO_2$ powder obtained by this type of ADU method it is necessary to take various measures such as use of elevated sintering temperature, prolonged sintering time, etc., which are however practically difficult to achieve.

When using $UO_2$ pellets as nuclear fuel it is necessary for the fuel to burn stably during irradiation. In this case, one of the indices for showing the state expressed by the term "burn stably" is the fission product gas (FP gas) is retained within the pellet as much as possible, or as little as possible an FP gas is released from the pellet. From the results of irradiation tests a tendency has been confirmed that the greater the grain size of the pellet the more excellent the ability of the pellet to retain FP gas. However, when the pellet has too great a grain size there is a possibility that there occurs harmful effects such as reduction in the mechanical strength, and therefore the grain size must be selected or adjusted appropriately. Although it has not yet been clarified completely as to which range of crystal grain size is appropriate it is presumed practically sufficient to use pellets with a grain size of up to 100 micrometers which is set up as a standard for the present. When $UO_2$ powder obtained by the conventional ADU method is used it is difficult to produce $UO_2$ pellets with a crystal grain size of greater than 20 micrometers in ordinary sintering methods and it is further difficult to produce $UO_2$ pellets having an appropriate crystal grain size.

SUMMARY OF THE INVENTION

An object of this invention is to obviate the above-described disadvantages of the conventional methods and provide a method of controlling the crystal grain size of $UO_2$ pellets to 5 to 100 micrometers.

As a result of intensive investigation it has now been found that the above-described disadvantages of the prior arts can be overcome by using an aqueous uranyl solution which is free of hydrofluoric acid and nitric acid and adjusting the composition of the uranium component, the concentration of uranium and the speed at which ammonia is contacted with the aqueous uranyl solution to specific ranges.

Therefore, this invention provides a method of controlling the crystal grain size of $UO_2$ pellets, comprising (1) providing an aqueous uranyl solution which is free of hydrofluoric acid and nitric acid and which contains uranyl fluoride ($UO_2F_2$) and/or uranyl nitrate ($UO_2(NO_2)_2$) as a uranium component, (2) reacting with ammonia said aqueous uranyl solution to precipitate ammonium diuranate (ADU), while adjusting the ratio of said uranium component to a predetermined value within the range varying from the ratio 100% of uranyl fluoride and 0% of uranyl nitrate (i.e., uranyl fluoride only) to the ratio 0% of uranyl fluoride and 100% of uranyl nitrate (i.e., uranyl nitrate only), adjusting the concentration of uranium in the reaction mixture to 50 to 1,000 gU/liter and also adjusting the rate of contact between said uranium component in said aqueous uranyl solution with ammonia to at least 2 moles $NH_3$/min/mole U, (3) calcining and reducing said ADU precipitate to form $UO_2$ powder, and (4) molding and sintering said $UO_2$ powder, thus producing $UO_2$ pellets having a predetermined crystal grain size in the range varying from 5 to 100 micrometers.

DETAILED DESCRIPTION OF THE INVENTION

The method of this invention differs in the step of precipitating ADU from the conventional ADU method. In the conventional ADU method, the aqueous uranyl solution used is an aqueous $UO_2F_2$ solution containing HF or a $UO_2(NO_3)_2$ solution, with the result that the crystal grain size of pellets produced from ADU through $UO_2$ powder has been at most 20 micrometers. On the contrary, this invention uses as an aqueous uranyl solution an aqueous $UO_2F_2$ solution free of HF and nitric acid. Use of $UO_2F_2$ substantially containing no HF as the aqueous uranyl solution enables production of pellets having a very large crystal grain size. When an aqueous $UO_2F_2$ solution not containing HF is reacted with ammonia the resulting ADU is composed of very fine primary grains because of lack of neutralization reaction which would occur in the presence of HF. The production of ADU involves formation of $NH_4F$ (cf. reaction scheme (II) above). $NH_4F$ thus formed serves as a binder for causing the very fine primary grains of ADU to adhere to each other, and therefore, the crystal grain size of $UO_2$ pellet produced from the fine primary grain ADU containing $NH_4F$ through $UO_2$ powder is very large, it is possible to produce pellets whose crystal grain size is as large as 100 micrometers if the production conditions are adjusted or controlled appropriately.

Production of pellets with different crystal grain sizes starting from an aqueous $UO_2F_2$ solution which is free of HF can be attained by controlling, on one hand, the concentration of uranium in the aqueous $UO_2F_2$ solution and, on the other hand, the speed of contact at which the uranium component is contacted with ammonia. More particularly, the lower the concentration of uranium, on one hand, and the higher the speed of contact of the uranium component with ammonia, on the other hand, the smaller the primary grain of ADU, resulting in the greater grain size of pellets produced from $UO_2$ powder through ADU. Thus, sintered $UO_2$ pellets having a desired crystal grain size in the range of 5 to 100 micrometers can be obtained by controlling the concentration of uranium to a predetermined value within the range varying from 50 to 1000 gU/liter, preferably 100 to 500 gU/liter, and the speed of contact of the uranium component with ammonia to a predetermined value not lower than 2 moles $NH_3$/min/mole U, preferably not lower than 30 moles $NH_3$/min/mole U.

Use of precipitation conditions outside the abovedescribed ranges should be avoided from the following reasons. That is, the concentration of uranium of below 50 gU/liter is practically unacceptable since it leads to increase in the size of apparatus system used and in the amount of liquid waste. The concentration of uranium of above 1,000 gU/liter is undesirable since it causes the viscosity of the aqueous uranyl solution to become too high to be practical, with the result that homogeneous ADU is difficult to produce. It is practically undesirable to set up the speed of contact at which the uranium component and ammonia are brought in contact with each other to a level below 2 moles $NH_3$/min/mole U because such a low speed of contact results in drastic decrease in the speed of production of ADU, which is practically unacceptable. When an aqueous $UO_2F_2$ solution free of HF is used as a starting material it is generally easy to produce pellets having a high sintered density and a large crystal grain size simultaneously. However, it is difficult to produce pellets having a high sintered density but a small crystal grain size. This problem can be overcome by using an aqueous $UO_2(NO_3)_2$ solution. That is, when the aqueous $UO_2(NO_3)_2$ solution is used as a starting material pellets having a high sintered density as high as 99% TD and a relatively small crystal grain diameter as small as about 20 micrometers can be produced; both the sintered density and crystal grain size of sintered pellets can be controlled by using as a starting material an aqueous mixed solution containing $UO_2F_2$ and $UO_2(NO_3)_2$ as a uranium component. When it is desired to obtain pellets with smaller crystal grain density it is sufficient to use an aqueous uranyl solution containing larger amount of $UO_2(NO_3)_2$.

This invention will be described in greater detail with reference to examples which are by way of example and do not limit in any way the scope of this invention.

EXAMPLE $UO_2F_2$ powder was dissolved in deionized water to obtain an aqueous $UO_2F_2$ solution. On the other hand, crystalline uranyl nitrate was dissolved in deionized water to obtain an aqueous $UO_2(NO_3)_2$ solution. The aqueous $UO_2F_2$ solution was mixed with the aqueous $UO_2(NO_3)_2$ solution in a ratio of 2 : 1 or 1 : 1 to produce two types of aqueous uranyl nitrate solutions. After adjusting the concentration of uranium of the solutions to predetermined values in the range of 50 to 1,000 gU/liter, ammonia water was added to the mixed solutions at a rate of 2 to 30 moles $NH_3$/min/mole U while stirring until pH 10.5 is reached to form precipitate of ADU. After washing with water, filtration and drying, the ADU precipitate was calcined and reduced in $H_2$ atmosphere at 650° C. for 2 hours to form $UO_2$ powder. The $UO_2$ powder was molded at a compacting pressure of 4 t/cm$^2$ and then sintered in $H_2$ atmosphere at 1,750° C. for 4 hours to form sintered pellets. The sintered density and crystal grain size of the $UO_2$ pellets obtained are shown in Table below.

TABLE

| | Conditions for Forming ADU Precipitate | | $UO_2$ Pellet | |
|---|---|---|---|---|
| | Aqueous Uranyl Solution | Speed of Addition | | |
| Uranium Component | Uranium Concentration (gU/liter) | of Ammonia Water (mole $NH_3$/min/mole U) | Sintered Density (% TD) | Crystal Grain Size (μm) |
| $UO_2F_2$ | 50 | 30 | 99.2 | 97 |
| | 100 | 30 | 98.8 | 60 |
| | 500 | 30 | 96.4 | 16 |
| | 1000 | 30 | 94.9 | 6 |
| | 100 | 10 | 97.3 | 43 |
| | 100 | 2 | 96.5 | 14 |
| $UO_2F_2$:$UO_2(NO_3)_2$ = 2:1 | 100 | 30 | 98.9 | 55 |
| $UO_2F_2$:$UO_2(NO_3)_2$ = 1:1 | 100 | 30 | 99.0 | 38 |
| $UO_2(NO_3)_2$ | 100 | 30 | 99.3 | 20 |

From the results shown in Table above it can be seen that the sintered density and crystal grain size of pellets decrease according as the concentration of uranium increases and according as the speed of addition of ammonia water decreases. In addition, it is possible to decrease only the crystal grain diameter by increasing the content of the $UO_2(NO_3)_2$ component in the aqueous uranyl solution with retaining the sintered density at a high level as high as 99% TD.

What is claimed is:

1. A method of controlling the crystal grain size of $UO_2$ pellets, comprising
   (1) providing an aqueous uranyl solution which is free of hydrofluoric acid and nitric acid and which contains uranyl fluoride ($UO_2F_2$) and/or uranyl nitrate ($UO_2(NO_3)_2$) as a uranium component,
   (2) reacting with ammonia said aqueous uranyl solution to precipitate ammonium diuranate (ADU), while adjusting the ratio of said uranium components to a predetermined value within the range varying from the ratio 100% of uranyl fluoride and 0% of uranyl nitrate to the ratio 0% or uranyl fluoride and 100% of uranyl nitrate, adjusting the concentration of uranium of the reaction mixture to 50 to 1,000 gU/liter and also adjusting the rate of contact between said uranium component in said aqueous uranyl solution wih ammonia to at least 2 moles $NH_3$/min/mole U,
   (3) calcining and reducing said ADU precipitate to form $UO_2$ powder, and
   (4) molding and sintering said $UO_2$ powder, thus producing $UO_2$ pellet having a predetermined crystal grain size in the range varying from 5 to 100 micrometeres.

2. The method as claimed in claim 1, wherein said rate of contact between said uranium component in said aqueous uranyl solution with ammonia is adjusted to 2 to 30 moles $NH_3$/min/mole U.

3. The method as claimed in claim 1, wherein concentration of uranium of said reaction mixture is in the range of from 100 to 500 gU/liter.

4. The method as claimed in claim 1, wherein the crystal grain size of $UO_2$ pellets is in the range of from 20 to 100 micrometers.

* * * * *

UNITED STATES PATENT AND TRADEMARK OFFICE
CERTIFICATE OF CORRECTION

PATENT NO. : 4,873,031

DATED : October 10, 1989

INVENTOR(S) : Tadeo Yato, et al.

It is certified that error appears in the above-identified patent and that said Letters Patent is hereby corrected as shown below:

Column 2, line 49: "$UO_2(NO_2)_2$" should read as --$UO_2(NO_3)_2$)--

Signed and Sealed this

Twenty-third Day of October, 1990

Attest:

HARRY F. MANBECK, JR.

*Attesting Officer*      *Commissioner of Patents and Trademarks*